US012730564B2

(12) United States Patent
Kim et al.

(10) Patent No.: US 12,730,564 B2
(45) Date of Patent: Sep. 8, 2026

(54) STORAGE CONTROLLER AND OPERATION METHOD THEREOF

(71) Applicant: Samsung Electronics Co., Ltd., Suwon-si (KR)

(72) Inventors: Kwanhyo Kim, Suwon-si (KR); Taec-Jun Kim, Suwon-si (KR); Sangwoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/761,913

(22) Filed: Jul. 2, 2024

(65) Prior Publication Data

US 2025/0199694 A1 Jun. 19, 2025

(30) Foreign Application Priority Data

Dec. 19, 2023 (KR) ........................ 10-2023-0185967

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS 10,613,782 B2 4/2020 Kim et al.
11,409,473 B2 8/2022 Um
2017/0091042 A1* 3/2017 Chou .................. G06F 11/1441
2019/0034107 A1 1/2019 Kim et al.
2020/0151104 A1* 5/2020 Yang .................. G06F 13/4282
2020/0409838 A1* 12/2020 Park ........................ G11C 16/30
2021/0191854 A1* 6/2021 Yang .................. G06F 13/1673
2021/0397558 A1 12/2021 Cho et al.
2022/0171569 A1 6/2022 Um
2022/0171707 A1* 6/2022 Lee ......................... G06F 12/10
2023/0153020 A1 5/2023 Uhm et al.

FOREIGN PATENT DOCUMENTS

KR 20190120536 A * 10/2019 ........... G06F 3/0683
KR 10-2277728 B1 7/2021
KR 10-2021-0156061 A 12/2021
KR 10-2022-0076803 A 6/2022
KR 10-2023-0071404 A 5/2023
KR 10-2553263 B1 7/2023

* cited by examiner

*Primary Examiner* — Hosain T Alam
*Assistant Examiner* — Subir Kumar Chowdhury
(74) *Attorney, Agent, or Firm* — Fish & Richardson P.C.

(57) ABSTRACT

A storage controller included in a storage device, the storage controller including an interrupt circuit that detects a sudden power off (SPO) with respect to the storage device, and issues a SPO notification and an emergency flush request; a central processing unit that receives the SPO notification and issues a program request; and a volatile memory device including a plurality of memory areas. A first non-volatile memory (NVM) interfacing circuit of the storage device programs data stored in a first memory area from among the plurality of memory areas to an external first non-volatile memory device in response to receiving the program request, and programs data stored in a second memory from area among the plurality of memory areas to the first non-volatile memory device in response to receiving the emergency flush request.

13 Claims, 14 Drawing Sheets

Figure 2:
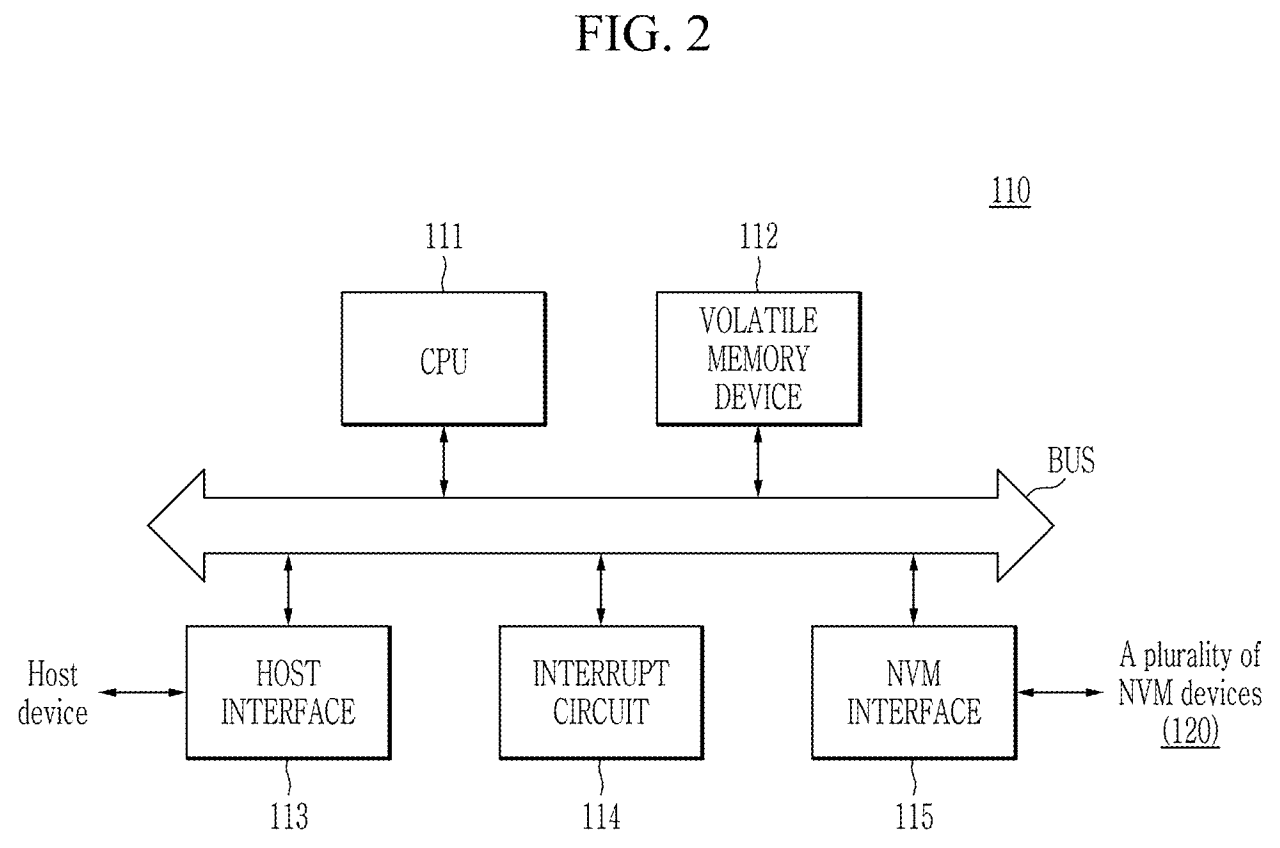

111 CPU

112 VOLATILE MEMORY DEVICE

BUS

113 HOST INTERFACE

114 INTERRUPT CIRCUIT

115 NVM INTERFACE

Host device

A plurality of NVM devices (120)

110
CPU
111
CORE#1
CORE#2
CR1
CR2
112
VOLATILE MEMORY DEVICE
BUS
② REQ_PGM
① NTF_SPO
115
NVM INTERFACE
NIC1
NIC2
NICn
NVM INTERFACING CIRCUIT #1
NVM INTERFACING CIRCUIT #2
NVM INTERFACING CIRCUIT #n
NVMD1
NVMD2
NVMDn
INTERRUPT CIRCUIT
114
HOST INTERFACE
113
Host device

FIG. 6

MA_PLP

SMA1_PLP [NIC1]

SMA2_PLP [NIC2]

⋮

SMAn_PLP [NICn]

110
BUS
CPU
111
VOLATILE MEMORY DEVICE
112
HOST INTERFACE
113
INTERRUPT CIRCUIT
114
REQ_EF
NVM INTERFACE
115
NVM INTERFACING CIRCUIT #1
NVM INTERFACING CIRCUIT #2
NVM INTERFACING CIRCUIT #n
NIC1
NIC2
NICn
NVMD1
NVMD2
NVMDn
Host device

SMA1_EF [NIC1]

SMA2_EF [NIC2]

⋮

SMAn_EF [NICn]

FIG. 10

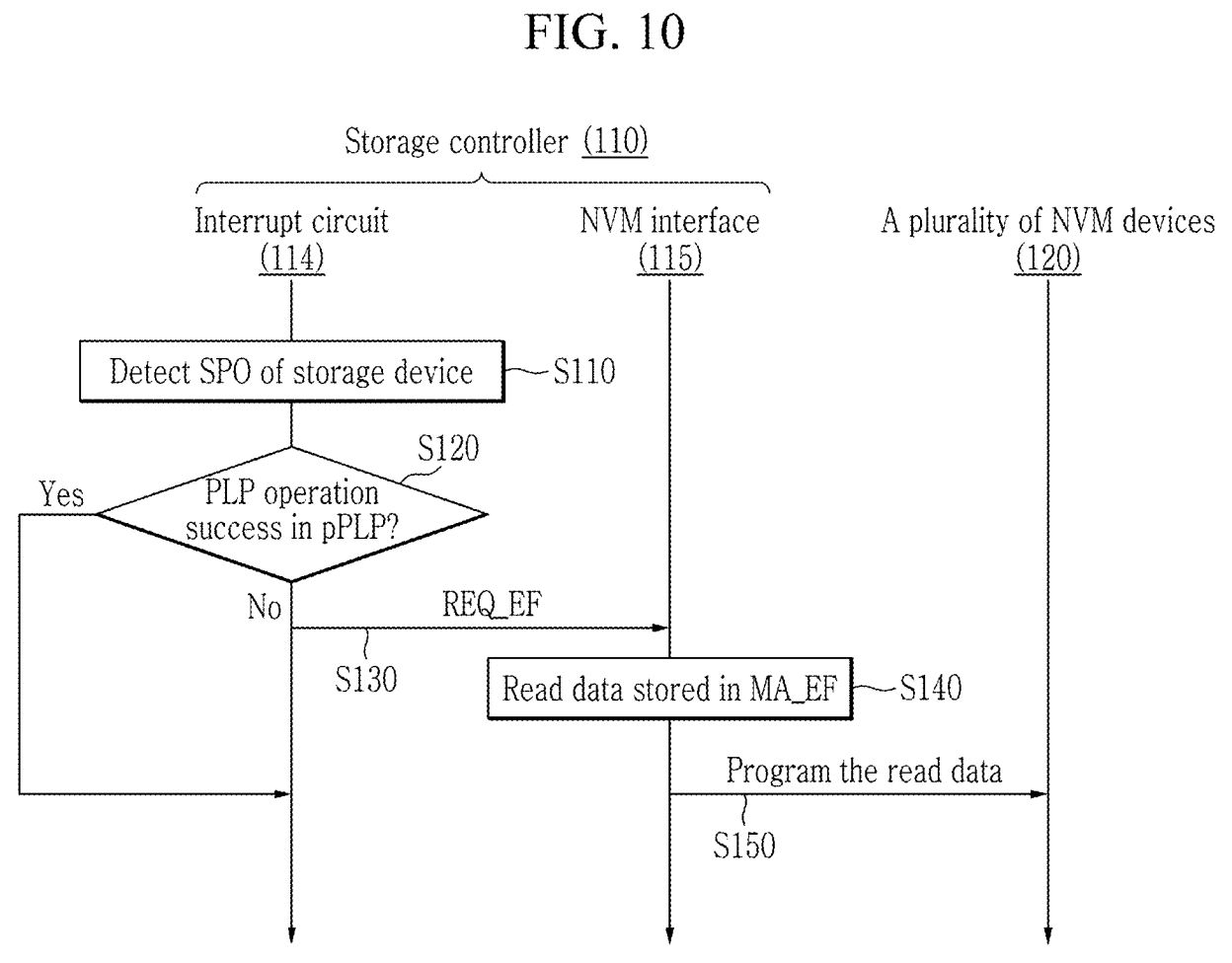

Storage controller (110)

Interrupt circuit (114)

NVM interface (115)

A plurality of NVM devices (120)

S110

Detect SPO of storage device

S120

PLP operation success in pPLP?

Yes

No

S130

REQ_EF

S140

Read data stored in MA_EF

S150

Program the read data

FIG. 12

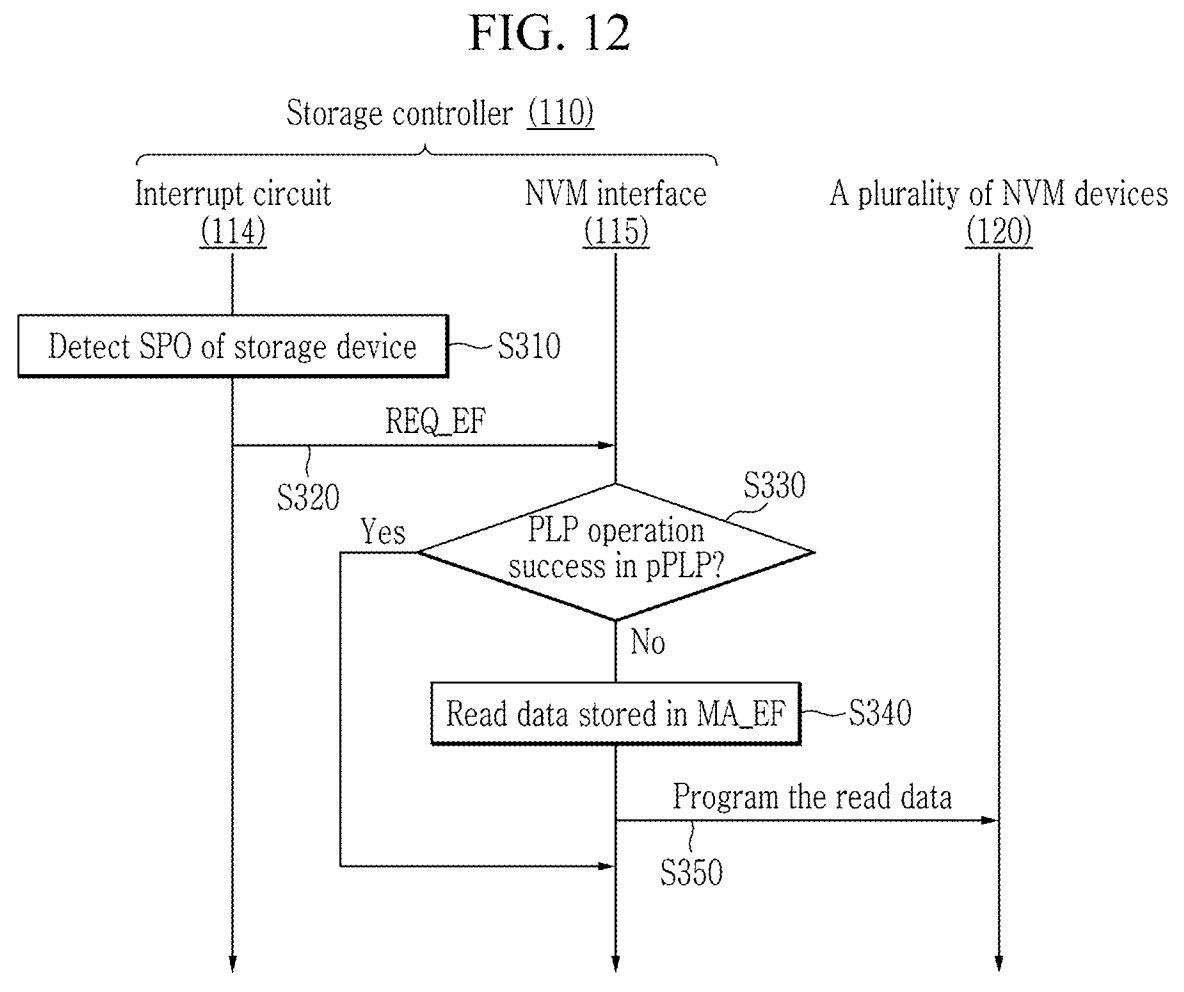

Storage controller (110)

Interrupt circuit (114)

NVM interface (115)

A plurality of NVM devices (120)

Detect SPO of storage device

S310

REQ_EF

S320

PLP operation success in pPLP?

S330

Yes

No

Read data stored in MA_EF

S340

Program the read data

Figure 13:
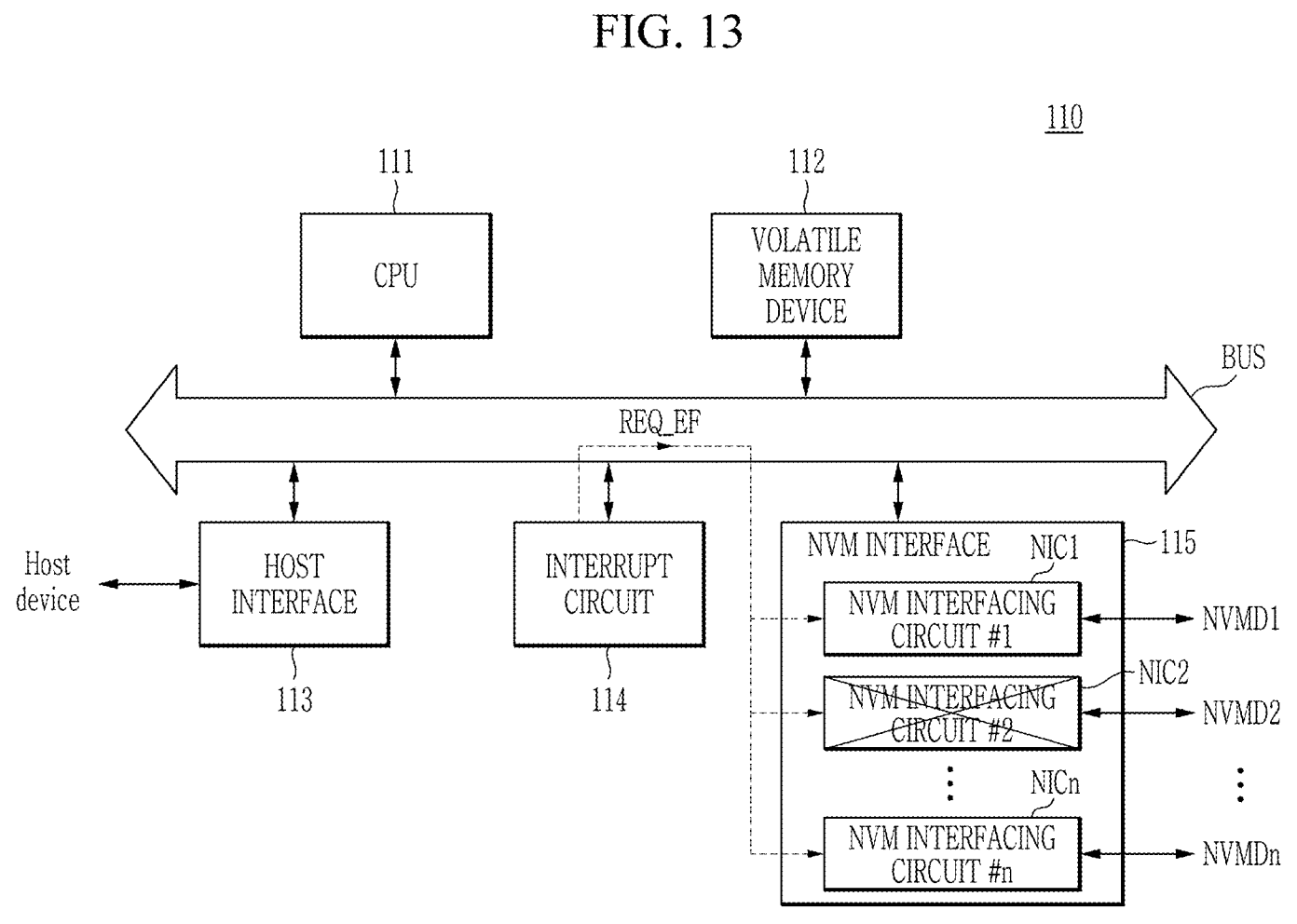

BUS
CPU
111
VOLATILE MEMORY DEVICE
112
HOST INTERFACE
113
INTERRUPT CIRCUIT
114
REQ_EF
NVM INTERFACE
115
NIC1
NVM INTERFACING CIRCUIT #1
NIC2
NVM INTERFACING CIRCUIT #2
NICn
NVM INTERFACING CIRCUIT #n
NVMD1
NVMD2
NVMDn
Host device

SMA1_EF [NIC1]

SMA2_EF [NIC2 → NIC1]

⋮

SMAn_EF [NICn]

STORAGE CONTROLLER AND OPERATION METHOD THEREOF

CROSS-REFERENCE TO RELATED APPLICATION

This application claims priority to and the benefit of Korean Patent Application No. 10-2023-0185967 filed in the Korean Intellectual Property Office on Dec. 19, 2023, the entire contents of which is incorporated herein by reference.

BACKGROUND

The present disclosure relates to semiconductor storage devices. Particularly, the present disclosure relates to a storage controller controlling non-volatile memory devices and an operation method thereof.

Semiconductor memory devices may be classified into volatile memory devices and non-volatile memory devices. In general, an operation speed of a non-volatile memory device is slower than that of a volatile memory device. Accordingly, even in storage devices including non-volatile memory devices, volatile memory devices are widely used as operating memories or cache memories of storage controllers.

If a sudden power off (SPO) occurs in a storage device, data stored in the volatile memory device may be lost. In order to prevent this, the storage controller may back up data stored in the volatile memory device to the non-volatile memory device while auxiliary power is supplied after the SPO occurs. However, the time during which the auxiliary power is provided after the SPO occurs may be very short, therefore the storage controller may need to back up data stored in the volatile memory device to the non-volatile memory device within a very short time length.

SUMMARY

The present disclosure is intended to solve the above-described technical problems and attempts to provide a storage controller and an operation method thereof capable of backing up data stored in a volatile memory device to a non-volatile memory device in a quicker manner.

Some example embodiments of the inventive concepts provide a storage controller in a storage device, the storage controller including an interrupt circuit that detects a sudden power off (SPO) with respect to the storage device, and issues a SPO notification and an emergency flush request; a central processing unit that receives the SPO notification and issues a program request; a volatile memory device including a plurality of memory areas; and a first non-volatile memory (NVM) interfacing circuit that programs data stored in a first memory area among the plurality of memory areas to an external first non-volatile memory device in response to receiving the program request, and that programs data stored in a second memory area among the plurality of memory areas to the external first non-volatile memory device in response to receiving the emergency flush request.

Some example embodiments of the inventive concepts further provide a storage controller that includes a central processing unit including a first core that issues a first program request, and a second core that issues a second program request; an interrupt circuit that issues an emergency flush request; and a non-volatile memory interface including a first non-volatile memory (NVM) interfacing circuit that issues a first program command in response to the first program request and that issues a second program command in response to the emergency flush request, and a second NVM interfacing circuit that issues a third program command in response to the second program request and that issues a fourth program command in response to the emergency flush request.

Some example embodiments of the inventive concepts still further provide an operation method of a storage controller in a storage device, the storage controller including a volatile memory device, a plurality of non-volatile memory (NVM) interfacing circuits, and an interrupt circuit that detects a sudden power off (SPO) with respect to the storage device. The operation method includes transmitting, by the interrupt circuit, an emergency flush request to each of the plurality of NVM interfacing circuits; reading, by each of the plurality of NVM interfacing circuits, a plurality of data stored in different memory areas of the volatile memory device in response to the emergency flush request; and programming, by the plurality of NVM interfacing circuits, the plurality of data to different non-volatile memory devices from among a plurality of non-volatile memory devices, respectively.

BRIEF DESCRIPTION OF THE DRAWINGS

FIG. 2 is a block diagram showing the storage controller of FIG. 1.

FIG. 6 is a drawing showing the PLP memory area of FIG. 4.

FIG. 8 is a drawing showing the emergency flush memory area of FIG. 4.

FIG. 10 is a flowchart showing an operation of the storage device of FIG. 1 performing an emergency flush operation according to some example embodiments.

FIG. 12 is a flowchart showing an operation of the storage device of FIG. 1 performing an emergency flush operation according to some example embodiments.

Figure 14:
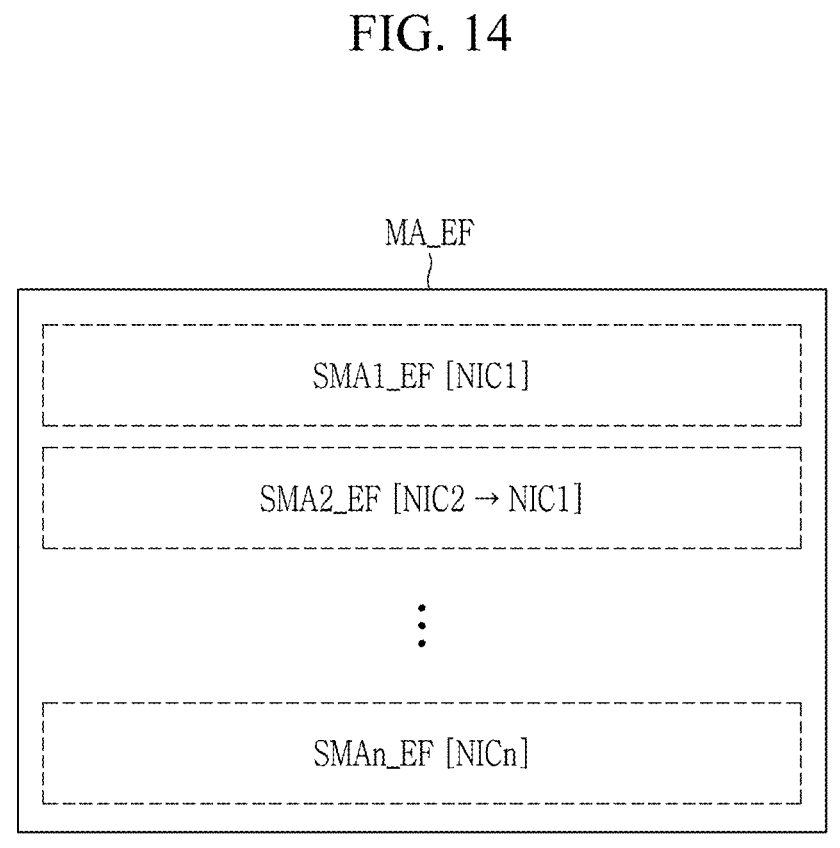

FIG. 13 and FIG. 14 are block diagrams showing an operation of the storage controller of FIG. 2 according to some example embodiments.

DETAILED DESCRIPTION

Hereinafter, some example embodiments will be described in detail and clearly to such an extent that one skilled in the art easily carries out the inventive concepts. The details such as components and structures described in the specification are merely provided to assist the overall understanding of some example embodiments. Therefore, it should be apparent to those skilled in the art that various changes and modifications of some example embodiments described herein may be made without departing from the scope and spirit of the inventive concepts. Moreover, the description of well-known functions and structures are omitted for the sake of clarity and brevity. In the following drawings or in the detailed description, components may be connected to any components other than components that are illustrated in drawings or are described in the detailed description. The terms described below are terms defined in consideration of the functions and are not limited to a specific function. The definitions of the terms should be determined based on the content throughout the specification.

Components that are described in the detailed description with reference to the terms "driver", "controller", "block", etc. may be implemented with software, hardware, or a combination thereof. For example, the software may be machine code, firmware, embedded code, and application software. For example, the hardware may include an electrical circuit, an electronic circuit, a processor, a microprocessor, a computer, integrated circuit cores, a pressure sensor, an inertial sensor, a microelectromechanical system (M EMS), a passive element, or a combination thereof.

Terminology such as for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

Figure 1:
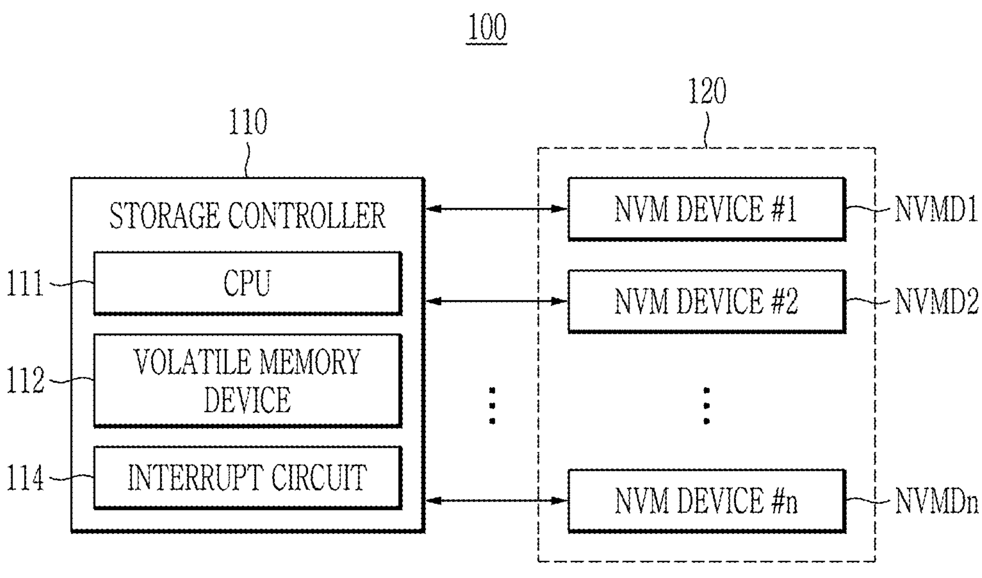
FIG. 1 is a block diagram showing a storage device according to some example embodiments of the inventive concepts.

FIG. 1 is a block diagram showing a storage device according to some example embodiments of the inventive concepts. Referring to FIG. 1, a storage device 100 may include a storage controller 110 and a plurality of non-volatile memory devices 120. The plurality of non-volatile memory devices 120 may include first to n-th non-volatile memory devices NVMD1 to NVMDn.

Hereinafter, it is assumed that each of the first to n-th non-volatile memory devices NVMD1 to NVMDn is a flash memory device, and the storage device 100 is a solid-state drive (SSD). However, the inventive concepts are not limited thereto.

The storage controller 110 may control the plurality of non-volatile memory devices 120. For example, the storage controller 110 may transmit command and/or address to each of the first to n-th non-volatile memory devices NVMD1 to NVMDn, to store data in the first to n-th non-volatile memory devices NVMD1 to NVMDn or read data stored in the first to n-th non-volatile memory devices NVMD1 to NVMDn.

In some example embodiments, each of the first to n-th non-volatile memory devices NVMD1 to NVMDn may be implemented as different semiconductor chip or die.

In some example embodiments, each of the first to n-th non-volatile memory devices NVMD1 to NVMDn may be implemented as one or more semiconductor packages implemented based on a multi-chip package (MCP).

The storage controller 110 may include a central processing unit 111. The central processing unit 111 may control an overall operation of the storage controller 110. For example, the central processing unit 111 may execute various types of programs, applications, and firmware executable on the storage controller 110. For example, central processing unit 111 may execute various types of programs, applications, and firmware that run on storage controller 110.

The storage controller 110 may include a volatile memory device 112. The volatile memory device 112 may be used as a buffer memory, an operating memory, or a cache memory of the storage controller 110. For example, the volatile memory device 112 may store various types of temporary data used for operations of programs, applications, firmware, or the like executable on the storage controller 110.

Data stored in the volatile memory device 112 may be lost when the power supply to the storage device 100 is interrupted. For example, the data stored in the volatile memory device 112 may be lost when the power supply from the outside of the storage device 100 is interrupted and the auxiliary power source (not shown) within the storage device 100 is exhausted.

The storage controller 110 may include an interrupt circuit 114. The interrupt circuit 114 may detect an sudden power off (SPO) having occurred on the storage device 100. The storage controller 110 may back-up data stored in the volatile memory device 112 to the plurality of non-volatile memory devices 120 when the SPO is detected. For example, the storage controller 110 may store or move the data stored in the volatile memory device 112 to the plurality of non-volatile memory devices 120. For example, even if the auxiliary power source (not shown) within the storage device 100 is exhausted after the SPO has occurred on the storage device 100, loss of the data stored in the volatile memory device 112 may be limited and/or prevented.

In some example embodiments, back-up of the data stored in the volatile memory device 112 may be triggered by the central processing unit 111 included in the storage controller 110. However, when a defect has occurred in an operation of the central processing unit 111 (e.g., when a defect exists within firmware or software executed on a central processing unit 111), the data stored in the volatile memory device 112 may not be normally backed-up in the plurality of non-volatile memory devices 120. The method of triggering the back-up of the data stored in the volatile memory device 112 by the central processing unit 111 is herein described in further detail with reference to FIG. 5.

In some example embodiments, the back-up of the data stored in the volatile memory device 112 may be directly triggered by the interrupt circuit 114. For example, regardless of whether a defect has occurred in the central processing unit 111, the data stored in the volatile memory device 112 may be backed-up in the plurality of non-volatile memory devices 120. The method of triggering the back-up of the data stored in the volatile memory device 112 by the interrupt circuit 114 is herein described in further detail with reference to FIG. 7.

Hereinafter, for brevity of description, it is assumed that the interrupt circuit 114 detects the SPO having occurred in the storage device 100 in an interrupt scheme. However, the scope of the inventive concepts is not limited to a particular scheme in which the interrupt circuit 114 detects the SPO. For example, the interrupt circuit 114 may be implemented to detect the SPO having occurred in the storage device 100 in a polling scheme.

FIG. 2 is a block diagram showing the storage controller of FIG. 1. Referring to FIG. 1 and FIG. 2, the storage controller 110 may include the central processing unit 111, the volatile memory device 112, a host interface 113, the interrupt circuit 114, and a non-volatile memory interface 115. The central processing unit 111, the volatile memory device 112, the host interface 113, the interrupt circuit 114, and the non-volatile memory interface 115 may be connected to each other through bus BUS.

The central processing unit 111 may control the overall operation of the storage controller 110. For example, the central processing unit 111 may execute various types of programs, applications, and firmware executable on the storage controller 110.

The volatile memory device 112 may be used as a buffer memory, an operating memory, or a cache memory of the storage controller 110. For example, the volatile memory device 112 may store various types of temporary data used for operations of programs, applications, firmware, or the like executable on the central processing unit 111. The data stored in the volatile memory device 112 will be described in further detail with reference to FIG. 4.

In some example embodiments, the volatile memory device 112 may be implemented based on a static random-access memory (SRAM) device, a dynamic random-access memory (DRAM) device, and/or combination thereof. However, the inventive concepts are not limited thereto.

The storage controller 110 may communicate with a host device outside the storage device 100 through the host interface 113. For example, the host interface 113 may communicate with the host device based on at least one of various types of host interfaces such as a peripheral component interconnect express (PCI-express) interface, a non-volatile memory express (NVMe) interface, a serial ATA (SATA) interface, a serial attached SCSI (SAS) interface, a universal flash storage (UFS) interface, or the like.

The interrupt circuit 114 may detect the SPO having occurred on the storage device 100. The function of the interrupt circuit 114 is described above with reference to FIG. 1, and is not described in further detail.

The storage controller 110 may communicate with the plurality of non-volatile memory devices 120 through the non-volatile memory interface 115. For example, the non-volatile memory interface 115 may include a plurality of non-volatile memory interfacing circuits (e.g., NVM interfacing circuits). Each of the plurality of NVM interfacing circuits may control one or more non-volatile memory device NVMD.

Each of the plurality of NVM interfacing circuits may communicate with one or more non-volatile memory devices NVMD based on NAND interface. For example, each of the plurality of NVM interfacing circuits may store data in one or more non-volatile memory devices NVMD or read data stored in one or more non-volatile memory devices NVMD, in response to a request provided from the central processing unit 111 or the interrupt circuit 114.

When the SPO is detected by the interrupt circuit 114, the storage controller 110 may perform a power-loss protection (PLP) operation. For example, the central processing unit 111 may transmit a program request with respect to the data stored in the volatile memory device 112 to the non-volatile memory interface 115. For example, in response to the program request, the non-volatile memory interface 115 may back-up the data stored in the volatile memory device 112 to the plurality of non-volatile memory devices 120. For example, the non-volatile memory interface 115 may provide program command with respect to the data stored in the volatile memory device 112 to the plurality of non-volatile memory devices 120, in response to the program request.

When the PLP operation has failed (e.g., when the data stored in the volatile memory device 112 is not normally programmed in the plurality of non-volatile memory devices 120), the storage controller 110 may perform an emergency flush operation. For example, the non-volatile memory interface 115 may back-up the data stored in the volatile memory device 112 to the plurality of non-volatile memory devices 120, in response to an emergency flush request provided from the interrupt circuit 114. For example, the non-volatile memory interface 115 may provide the program command with respect to the data stored in the volatile memory device 112 to the plurality of non-volatile memory devices 120, in response to the emergency flush request.

That is, when the emergency flush operation is performed according to some example embodiments of the inventive concepts, the interrupt circuit 114 may directly transmit the emergency flush request to the non-volatile memory interface 115. For example, the interrupt circuit 114 may directly transmit the emergency flush request to the non-volatile memory interface 115 without going through the central processing unit 111. For example, even if a defect occurs in the operation of the central processing unit 111, the non-volatile memory interface 115 may be capable of normally backing-up the data stored in the volatile memory device 112.

Hereinafter, for brevity of description, some example embodiments in which the storage controller 110 sequentially performs the PLP operation and the emergency flush operation after the SPO occurred will be described as a representative example. However, the scope of the inventive concepts is not limited thereto, and the storage controller 110 may omit the PLP operation, and may only perform the emergency flush operation. The PLP operation and the emergency flush operation will be described in further detail with reference to FIG. 3 to FIG. 4.

Hereinafter, for brevity of description, it is assumed that the back-up of the data stored in the volatile memory device 112 while performing the PLP operation is triggered by the central processing unit 111, and the back-up of the data stored in the volatile memory device 112 while performing the emergency flush operation is triggered by the interrupt circuit 114. However, the scope of the inventive concepts is not limited thereto, and the back-up of the data stored in the volatile memory device 112 while the PLP operation is performed may also be triggered by the interrupt circuit 114.

Figure 3:
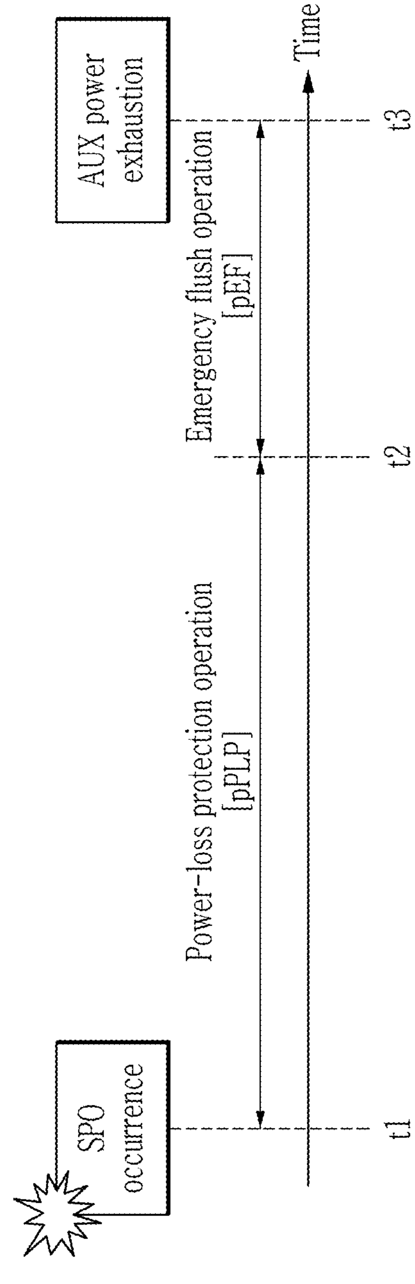
FIG. 3 is a drawing showing an operation of the storage controller of FIG. 2 in a case when an SPO has occurred.

FIG. 3 is a drawing showing an operation of the storage controller of FIG. 2 in the case when an SPO has occurred. Referring to FIG. 1 to FIG. 3, the SPO may occur on the storage device 100 at a first time point t1. For example, the storage controller 110 may perform a power-loss protection (PLP) operation from the first time point t1 to a second time point t2. Hereinafter, for brevity of description, a time period between the first time point t1 and the second time point t2 (e.g., a time period in which the PLP operation is performed) will be referred to as a PLP period pPLP.

The storage controller 110 may back-up the data stored in the volatile memory device 112 to the plurality of non-volatile memory devices 120 during the PLP period pPLP. For example, the central processing unit 111 may transmit the program request to the non-volatile memory interface 115. For example, the non-volatile memory interface 115 may back-up the data stored in the volatile memory device 112 to the plurality of non-volatile memory devices 120, in response to the program request.

When the PLP operation has failed up until the second time point t2 (e.g., when backing up of the data stored in the volatile memory device 112 to the plurality of non-volatile memory devices 120 through the PLP operation has failed), the storage controller 110 may perform the emergency flush operation. For example, the storage controller 110 may perform the emergency flush operation, from the second time point t2 to a third time point t3 of which the auxiliary power source of the storage device 100 is exhausted. Hereinafter, for brevity of description, a time period between the second time point t2 and the third time point t3 (e.g., a time period in which the emergency flush operation is performed) will be referred to as an emergency flush period pEF.

The storage controller 110 may back-up the data stored in the volatile memory device 112 to the plurality of non-volatile memory devices 120 during the emergency flush period pEF. That is, the storage controller 110 may re-attempt the back-up of the data stored in the volatile memory device 112 during the emergency flush period pEF. For example, the non-volatile memory interface 115 may back-up the data stored in the volatile memory device 112 to the plurality of non-volatile memory devices 120, in response to the emergency flush request provided from the interrupt circuit 114. For example, the non-volatile memory interface 115 may provide the program command with respect to the data stored in the volatile memory device 112 to the plurality of non-volatile memory devices 120, in response to the emergency flush request.

In some example embodiments, when the PLP operation is successful, the emergency flush operation may not be performed. For example, when the storage controller 110 determines that the PLP operation is successful between the first time point t1 and the second time point t2, the storage controller 110 may omit the emergency flush operation perform.

In some example embodiments, the interval between the first time point t1 and the second time point t2 may be predetermined. For example, when it is not determined that the PLP operation is successful until a predetermined time length has lapsed from the first time point t1, the storage controller 110 may perform the emergency flush operation.

In some example embodiments, during the PLP period pPLP, the storage controller 110 may attempt to back up most of the data stored in the volatile memory device 112. On the other hand, during the emergency flush period pEF, the storage controller 110 may attempt back-up of data having high importance among the data stored in the volatile memory device 112 (e.g., data resulting fatal affect to the operation of the storage device 100 when lost). Data of which back-up is attempted in the PLP period pPLP and the emergency flush period pEF will be described in further detail with reference to FIG. 4.

In some example embodiments, the non-volatile memory interface 115 may operate in response to the request received on the PLP period pPLP and the emergency flush period pEF through different paths. For example, the non-volatile memory interface 115 may operate in response to a request received through a normal path (e.g., a first path) between the central processing unit 111 and the non-volatile memory interface 115 during the PLP period pPLP, and may operate in response to a request received through an emergency path (e.g., a second path) between the interrupt circuit 114 and the non-volatile memory interface 115 during the emergency flush period pEF. The path through which the non-volatile memory interface 115 receives the request during the PLP period pPLP and the emergency flush period pEF will be described in further detail with reference to FIG. 5 and FIG. 7.

In some example embodiment, a length of the PLP period pPLP may be longer than a length of the emergency flush period pEF. However, the inventive concepts are not limited thereto.

Figure 4:
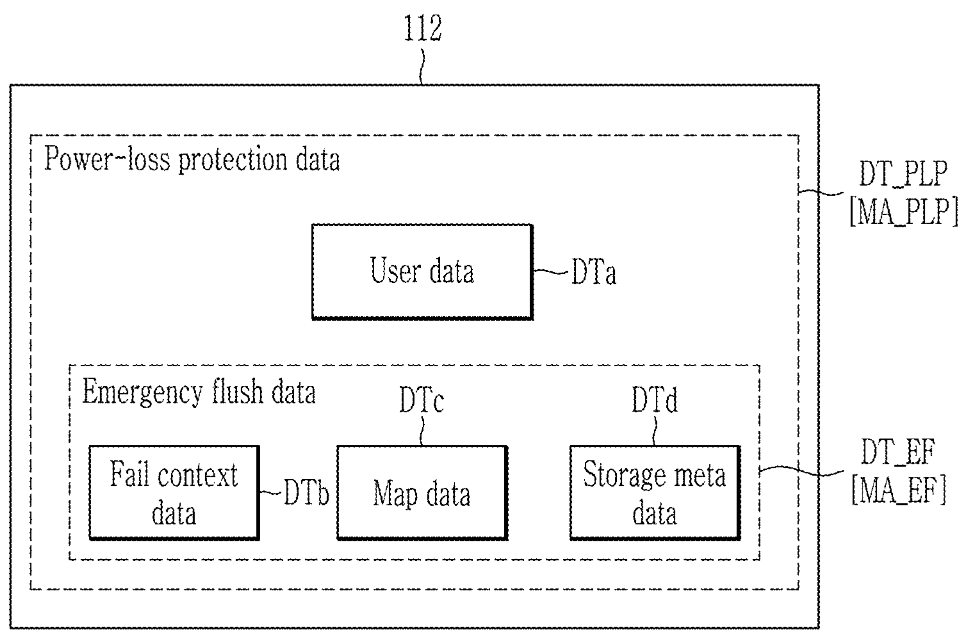
FIG. 4 is a block diagram showing the volatile memory device of FIG. 2.

FIG. 4 is a block diagram showing the volatile memory device of FIG. 2. Referring to FIG. 1 to FIG. 4, the volatile memory device 112 may include a PLP data DT_PLP and an emergency flush data DT_EF. The PLP data DT_PLP may be stored in a PLP memory area MA_PLP, and the emergency flush data DT_EF may be stored in an emergency flush memory area MA_EF.

The emergency flush data DT_EF may be included in the PLP data DT_PLP. For example, the emergency flush memory area MA_EF may be included in the PLP memory area MA_PLP.

The PLP data DT_PLP may include a user data DTa and the emergency flush data DT_EF. For example, the user data DTa may refer to data provided from the host device for storage in the plurality of non-volatile memory devices 120. However, the inventive concepts are not limited thereto.

The emergency flush data DT_EF may include data required for a normal operation of the storage device 100. For example, the emergency flush data DT_EF may include a fail context data DTb, a map data DTc, and a storage meta data DTd. For example, the fail context data DTb may be data for analyzing the cause of the operation failure of the storage device 100, the map data DTc may be data for mapping logical addresses and physical addresses of the storage device 100, and the storage meta data DTd may represent various attributes or state information about the storage device.

The storage controller 110 may back-up the PLP data DT_PLP during the PLP period pPLP. For example, the storage controller 110 may store the user data DTa, the fail context data DTb, the map data DTc, and the storage meta data DTd in the plurality of non-volatile memory devices 120 during the PLP period pPLP. However, the scope of inventive concepts is not limited thereto, and the data to be backed-up by the storage controller 110 during the PLP period pPLP may be determined in a vendor-specific method. For example, the storage controller 110 may not back-up a part of the user data DTa, the fail context data DTb, the map data DTc, and the storage meta data DTd to the plurality of non-volatile memory devices 120 during the PLP period pPLP.

The storage controller 110 may back-up the emergency flush data DT_EF during the emergency flush period pEF. For example, the storage controller 110 may store the fail context data DTb, the map data DTc, and the storage meta data DTd in the plurality of non-volatile memory devices 120 during the PLP period pPLP. However, the scope of the inventive concepts is not limited thereto, and the data to be backed-up by the storage controller 110 during the emergency flush period pEF may be determined in a vendor-specific method. For example, during the emergency flush period pEF, the storage controller 110 may further back-up a part of the user data DTa to the plurality of non-volatile memory devices 120, or may not back-up a part of the fail context data DTb to the plurality of non-volatile memory devices 120.

Figure 5:
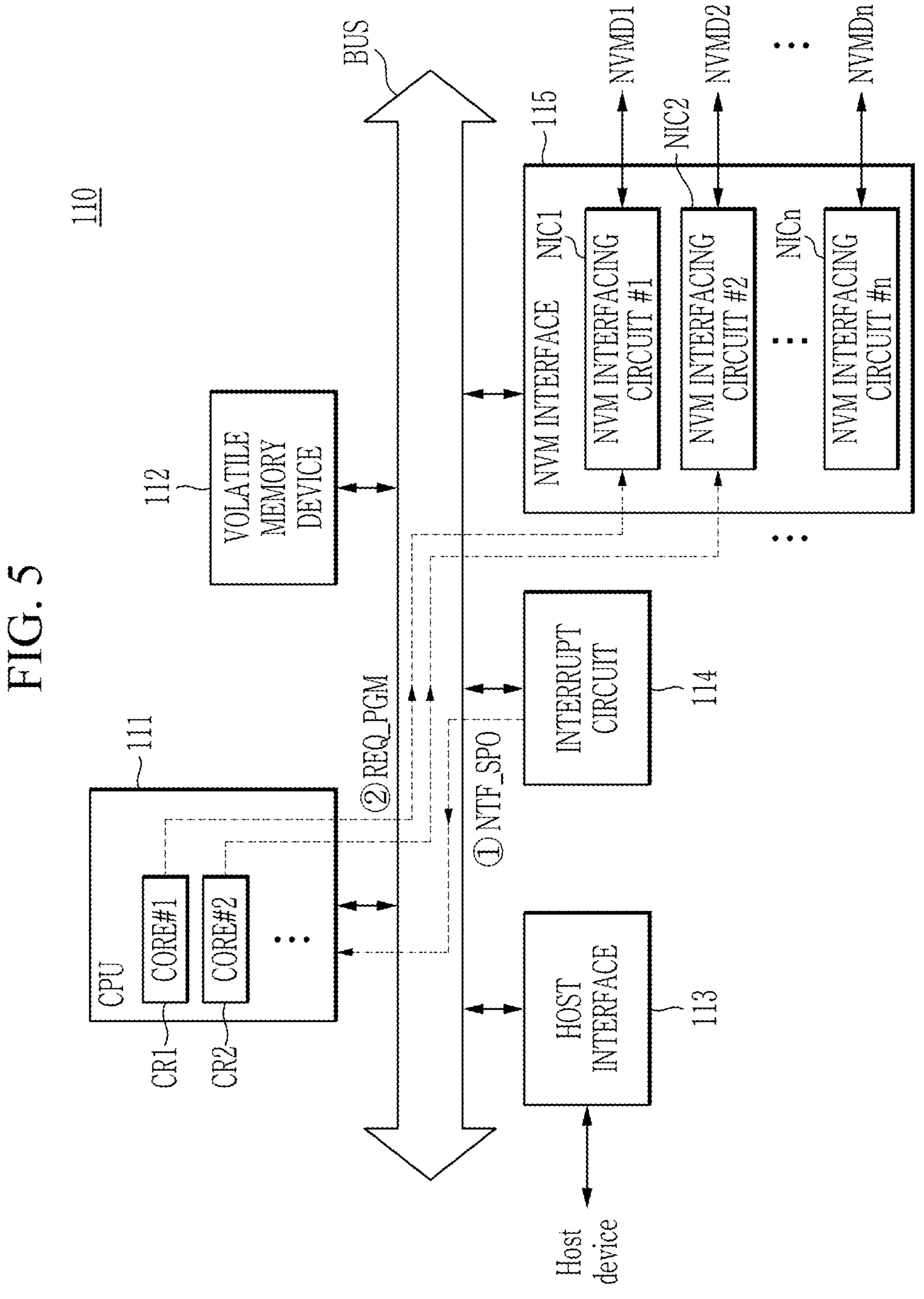
FIG. 5 is a block diagram showing the storage controller of FIG. 2 performing a power-loss protection (PLP) operation.

FIG. 5 is a block diagram showing the storage controller of FIG. 2 performing a PLP operation. Referring to FIG. 1 to FIG. 5, the storage controller 110 may include the central processing unit 111, the volatile memory device 112, the host interface 113, the interrupt circuit 114, and the non-volatile memory interface 115.

The central processing unit 111 may include a plurality of cores CR. For example, the plurality of cores CR may include a first core CR1 and a second core CR2.

In some example embodiments, each of the plurality of cores CR may be a NAND core, a flash core, or a combination thereof included in the central processing unit 111. However, the inventive concepts are not limited thereto.

The non-volatile memory interface 115 may include the plurality of NVM interfacing circuits NIC. The plurality of NVM interfacing circuits NIC may include first to n-th NVM interfacing circuits NIC1 to NICn. The first to n-th NVM interfacing circuits NIC1 to NICn may communicate with different non-volatile memory devices. For example, the first to n-th NVM interfacing circuits NIC1 to NICn may communicate with the first to n-th non-volatile memory devices NVMD1 to NVMDn, respectively.

For brevity of description, some example embodiments in which each of the first to n-th NVM interfacing circuits NIC1 to NICn controls one non-volatile memory device NVMD is described with reference to FIG. 5, but the scope of the inventive concepts is not limited thereto. For example, each of the first to n-th NVM interfacing circuits NIC1 to NICn may be configured to control a plurality of non-volatile memory devices NVMD.

In some example embodiments, each of the plurality of NVM interfacing circuits NIC may be implemented as a flash IP (flash intellectual property) operating in response to the request of the central processing unit 111. However, the inventive concepts are not limited thereto.

The interrupt circuit 114 may transmit the SPO notification NTF_SPO to the central processing unit 111. For example, the interrupt circuit 114 may transmit the SPO notification NTF_SPO to each of the plurality of cores CR, in response to detecting the SPO with respect to the storage device 100.

Each of the plurality of cores CR may transmit a program request REQ_PGM to a corresponding NVM interfacing circuit, in response to the SPO notification NTF_SPO. For example, the first core CR1 may transmit a program request REQ_PGM to a first NVM interfacing circuit NIC1, and the second core CR2 may transmit a program request REQ_PGM to a second NVM interfacing circuit NIC2.

In some example embodiments, the central processing unit 111 may transmit the program requests REQ_PGM through the normal path formed between the central processing unit 111 and the non-volatile memory interface 115.

For brevity of description, an some example embodiments in which each of the plurality of cores CR controls one NVM interfacing circuit NIC is described with reference to FIG. 5, but the scope of the inventive concepts is not limited thereto. For example, each of the plurality of cores CR may be configured to control the plurality of NVM interfacing circuits.

Each of the plurality of NVM interfacing circuits NIC may issue a program command with respect to data stored in different memory areas included in the PLP memory area MA_PLP, in response to the program request REQ_PGM. For example, a plurality of memory areas included in the PLP memory area MA_PLP may be allocated to the plurality of NVM interfacing circuits NIC, respectively. For a more specific example, the first NVM interfacing circuit NIC1 may provide a program command with respect to data stored in a first memory area of the volatile memory device 112 to a first non-volatile memory device NVMD1. Similarly, the second NVM interfacing circuit NIC2 may provide a program command with respect to data stored in a second memory area of the volatile memory device 112 to a second non-volatile memory device NVMD2.

A memory area backed-up by each of the plurality of NVM interfacing circuits NIC (e.g., a memory area allocated to each of the plurality of NVM interfacing circuits NIC) will be described in further detail with reference to FIG. 6.

Figure 6:
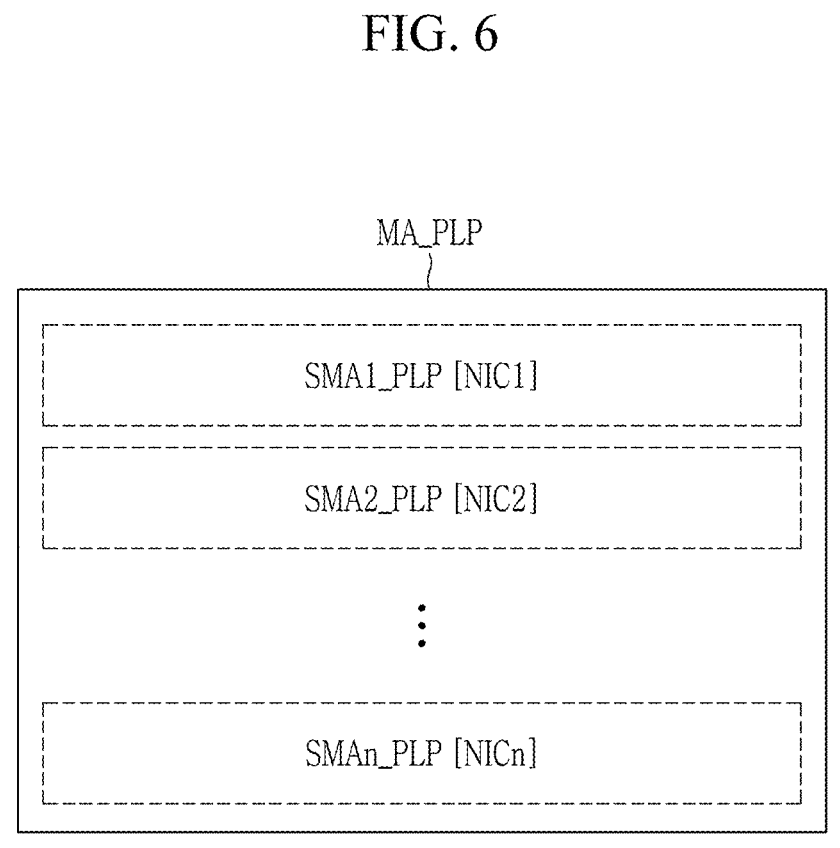

FIG. 6 is a drawing showing the PLP memory area of FIG. 4 in more detail. Referring to FIG. 1 to FIG. 6, the PLP memory area MA_PLP may include first to n-th sub-memory areas SMA1_PLP to SMAn_PLP. The first to n-th sub-memory areas SMA1_PLP to SMAn_PLP may not overlap with each other. However, the inventive concepts are not limited thereto.

The first to n-th sub-memory areas SMA1_PLP to SMAn_PLP may be predetermined. For example, the first to n-th sub-memory areas SMA1_PLP to SMAn_PLP may be set in the initial setup operation of the storage device 100. However, the inventive concepts are not limited thereto.

The first to n-th NVM interfacing circuits NIC1 to NICn may back-up data stored in the first to n-th sub-memory areas SMA1_PLP to SMAn_PLP, respectively. For example, the first NVM interfacing circuit NIC1 may program the data stored in a first sub-memory area SMA1_PLP to the first non-volatile memory device NVMD1, and the second NVM interfacing circuit NIC2 may program the data stored in a second sub-memory area SMA2_PLP to the second non-volatile memory device NVMD2. In this way, each of the first to n-th NVM interfacing circuits NIC1 to NICn may program data stored in different sub-memory areas allocated in advance to a corresponding non-volatile memory device NVMD.

In some example embodiments, during the PLP period pPLP, the PLP operation may fail due to an operation defect of some of the plurality of cores CR. That is, during the PLP period pPLP, due to a hardware defect or a software defect, some of the plurality of cores CR may not normally issue the program request REQ_PGM. For example, the first core CR1 may not normally provide the program request REQ_PGM to the first NVM interfacing circuit NIC1. For example, the data stored in the first sub-memory area SMA1_PLP may not be normally programmed in the first non-volatile memory device NVMD1. Accordingly, when the data stored in the first sub-memory area SMA1_PLP is essential data used for the normal operation of the storage device 100 (e.g., when the first sub-memory area SMA1_PLP includes at least a portion of the map data DTc), a fatal problem may occur in the operation of the storage device 100.

In some example embodiments, the PLP operation may fail due to the operation defect of all of the plurality of cores CR during the PLP period pPLP. For example, during the PLP period pPLP, due to a logical defect of software or firmware executed on the plurality of cores CR, none of the plurality of cores CR may normally issue the program request REQ_PGM. For example, the data stored in the volatile memory device 112 may not be programmed to the plurality of non-volatile memory devices 120, and accordingly, a fatal problem may occur in the operation of the storage device 100.

In some example embodiments, when the data stored in the first to n-th sub-memory areas SMA1_PLP to SMAn_PLP are backed-up in the plurality of non-volatile memory devices 120, the interrupt circuit 114 may determine that the PLP operation is successful. On the other hand, when some of the data stored in the first to n-th sub-memory areas SMA1_PLP to SMAn_PLP is not backed-up in the plurality of non-volatile memory devices 120, the interrupt circuit 114 may determine that the PLP operation has failed.

Figure 7:
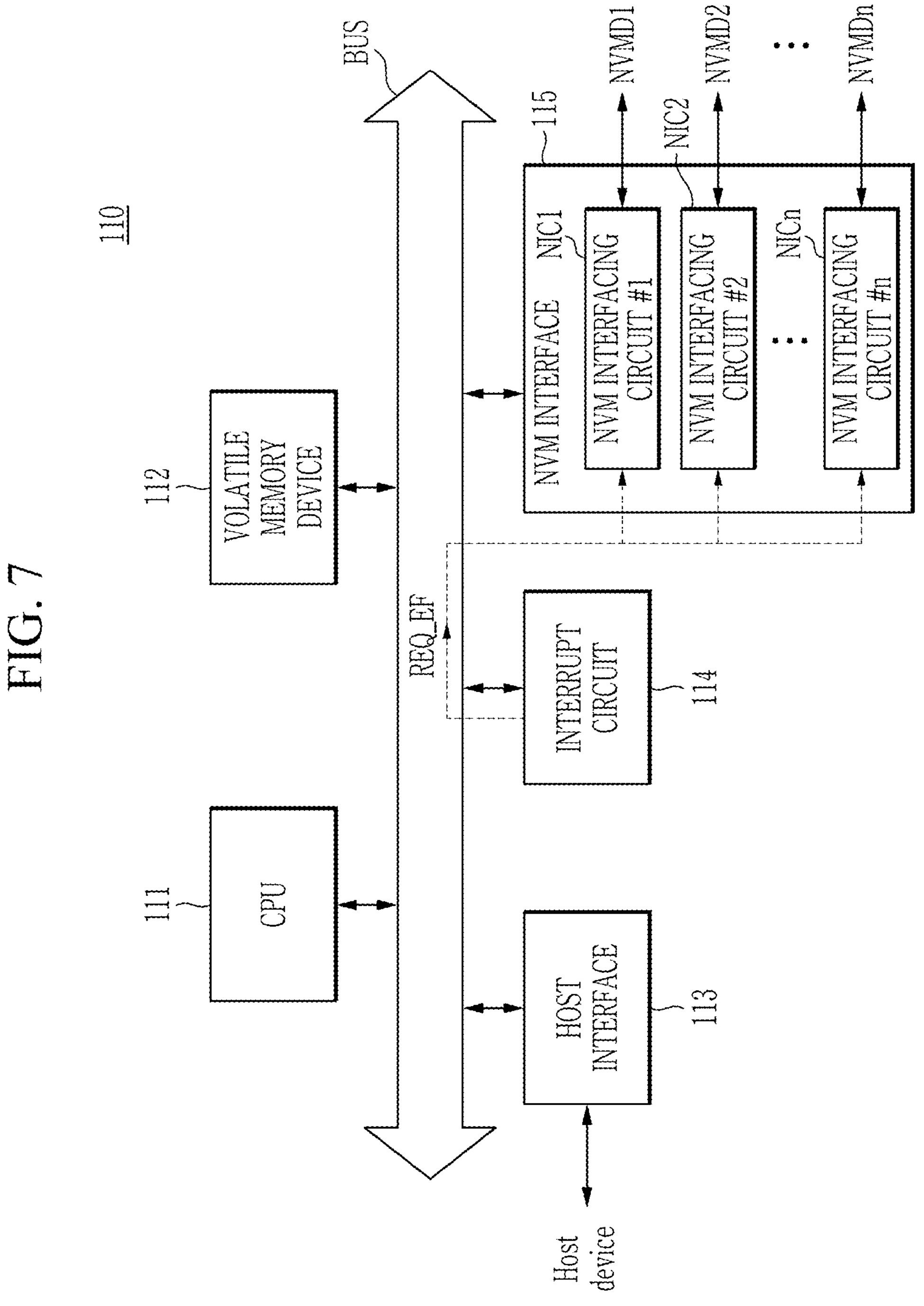
FIG. 7 is a block diagram showing the storage controller of FIG. 2 performing an emergency flush operation.

FIG. 7 is a block diagram showing the storage controller of FIG. 2 performing the emergency flush operation. Referring to FIG. 1 to FIG. 7, the storage controller 110 may include the central processing unit 111, the volatile memory device 112, the host interface 113, the interrupt circuit 114, and the non-volatile memory interface 115. The non-volatile memory interface 115 may include the plurality of NVM interfacing circuits NIC. For brevity of description, detailed description of components of the storage controller 110 described above with reference to FIG. 5 is not redundantly included herein.

Hereinafter, for brevity of description, some example embodiments in which the interrupt circuit 114 issues an emergency flush request REQ_EF after the PLP operation has failed will be described as a representative example. However, the scope of the inventive concepts is not limited thereto, and the interrupt circuit 114 may be implemented to issue the emergency flush request REQ_EF at (or right after) the first time point t1 when occurrence of the SPO with respect to the storage device 100 is detected. Some example embodiments in which the interrupt circuit 114 issues the emergency flush request REQ_EF at (or right after) the first time point t1 is herein described in further detail with reference to FIG. 12.

The interrupt circuit 114 may determine that the PLP operation has failed at the second time point t2. For example, the interrupt circuit 114 may determine that some of the data stored in the first to n-th sub-memory areas SMA1_PLP to SMAn_PLP has not been backed-up in the plurality of non-volatile memory devices 120 until the second time point t2. For example, the interrupt circuit 114 may transmit the emergency flush request REQ_EF to the non-volatile memory interface 115. For example, the interrupt circuit 114 may transmit the emergency flush request REQ_EF to each of the first to n-th NVM interfacing circuits NIC1 to NICn in response to failure of the PLP operation.

In some example embodiments, the interrupt circuit 114 may transmit the emergency flush request REQ_EF through the emergency path formed between the interrupt circuit 114 and the non-volatile memory interface 115.

Each of the first to n-th NVM interfacing circuits NIC1 to NICn may issue a program command with respect to the data stored in different memory areas within the emergency flush memory area MA_EF, in response to the emergency flush request REQ_EF. For example, the plurality of memory areas included in the emergency flush memory area MA_EF may be allocated to the plurality of NVM interfacing circuits NIC, respectively. For example, the first NVM interfacing circuit NIC1 may provide a program command with respect to data stored in a first memory area of the emergency flush memory area MA_EF to the first non-volatile memory device NVMD1. Similarly, the second NVM interfacing circuit NIC2 may provide a program command with respect to data stored in a second memory area of the emergency flush memory area MA_EF to the second non-volatile memory device NVMD2.

A memory area backed-up by each of the first to n-th NVM interfacing circuits NIC1 to NICn (e.g., a memory area allocated to each of the first to n-th NVM interfacing circuits NIC1 to NICn) will be described in further detail with reference to FIG. 8.

Figure 8:
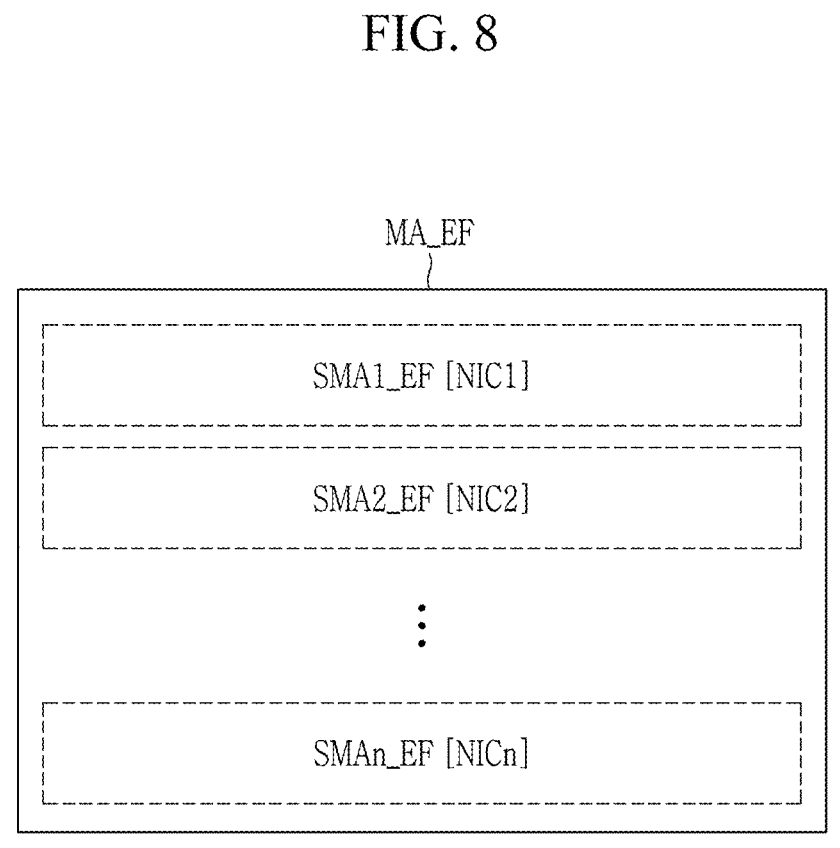

FIG. 8 is a drawing showing the emergency flush memory area of FIG. 4. Referring to FIG. 1 to FIG. 8, the emergency flush memory area MA_EF may include first to n-th sub-memory areas SMA1_EF to SMAn_EF. The first to n-th sub-memory areas SMA1_EF to SMAn_EF may not overlap with each other. However, the inventive concepts are not limited thereto.

The first to n-th sub-memory areas SMA1_EF to SMA-n_EF may be predetermined. For example, the first to n-th sub-memory areas SMA1_EF to SMAn_EF may be set in the initial setup operation of the storage device 100. However, the inventive concepts are not limited thereto.

The first to n-th NVM interfacing circuits NIC1 to NICn may back-up the data stored in the first to n-th sub-memory areas SMA1_EF to SMAn_EF, respectively. For example, the first NVM interfacing circuit NIC1 may program the data stored in a first sub-memory area SMA1_EF to the first non-volatile memory device NVMD1, and the second NVM interfacing circuit NIC2 may program the data stored in a second sub-memory area SMA2_EF to the second non-volatile memory device NVMD2. In this way, each of the first to n-th NVM interfacing circuits NIC1 to NICn may program the data stored in different sub-memory areas allocated in advance to a corresponding non-volatile memory device NVMD.

That is, according to some example embodiments of the inventive concepts, the emergency flush operation may be performed without going through the central processing unit 111 (e.g., regardless of the central processing unit 111). For example, the emergency flush operation may be triggered by the emergency flush request REQ_EF directly provided from the interrupt circuit 114 to the non-volatile memory interface 115. For example, unlike the program request REQ_PGM transmitted through the normal path between the central processing unit 111 and the non-volatile memory interface 115, the emergency flush request REQ_EF may be transmitted through the emergency path between the interrupt circuit 114 and the non-volatile memory interface 115. For example, regardless of whether an operation defect has occurred in the plurality of cores CR, the emergency flush operation may be normally performed. Therefore, according to some example embodiments of the inventive concepts, after the occurrence of the SPO, the data stored in the emergency flush memory area MA_EF may be safely backed-up in the plurality of non-volatile memory devices 120, and may be recovered in a subsequent power cycle of the storage device 100 (e.g., after the auxiliary power source of the storage device 100 is exhausted and then the storage device 100 is rebooted). As a result, according to some example embodiments of the inventive concepts, even if the SPO occurs in the storage device 100, defect possibility of the storage device 100 may be reduced and/or minimized.

For brevity of description, in FIG. 1 to FIG. 8, some example embodiments in which the emergency flush operation is performed after the PLP operation is performed was described as a representative example. However, the scope of the inventive concepts is not limited thereto, and the storage controller 110 may be configured to immediately perform the emergency flush operation, without performing the PLP operation immediately after the occurrence of the SPO.

For brevity of description, in FIG. 1 to FIG. 8, an some example embodiments in which the emergency flush memory area MA_EF is included in the PLP memory area MA_PLP was described as a representative example. However, the scope of the inventive concepts is not limited thereto, and the emergency flush memory area MA_EF and the PLP memory area MA_PLP may be identical to each other.

In some example embodiments, the storage controller 110 may be implemented to perform the emergency flush operation when a defect has occurred in an operation of the plurality of cores CR. For example, when the PLP operation has failed because of a defect has occurred in the operation of the plurality of cores CR, the interrupt circuit 114 may be implemented to issue the emergency flush request REQ_EF. However, the scope of the inventive concepts is not limited thereto, and even if a defect does not occur in the operation of the plurality of cores CR, the storage controller 110 may be implemented to perform the emergency flush operation.

Figure 9:
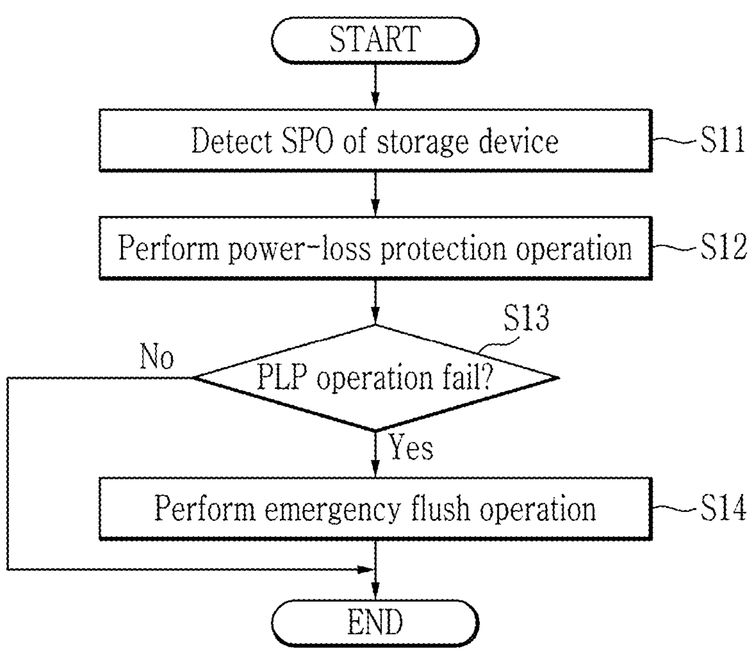
FIG. 9 is a flowchart showing an operation of the storage controller of FIG. 2.

FIG. 9 is a flowchart showing an operation of the storage controller of FIG. 2. Referring to FIG. 1 to FIG. 9, at operation S11, the storage controller 110 may detect the SPO of the storage device 100. For example, the interrupt circuit 114 may detect the SPO of the storage device 100.

At operation S12, the storage controller 110 may perform the PLP operation. For example, the storage controller 110 may attempt to back-up the data stored in the PLP memory area MA_PLP to the plurality of non-volatile memory devices 120.

At operation S13, the storage controller 110 may determine whether the PLP operation has failed. For example, the storage controller 110 may determine whether the data stored in the PLP memory area MA_PLP has been successfully backed-up in the plurality of non-volatile memory devices 120.

At operation S13, when it is determined that the PLP operation has failed (e.g., Yes at S13), operation S14 below may be performed.

At operation S13, when it is determined that the PLP operation is successful (e.g., No at S13), the operation of the storage controller 110 may be terminated.

At operation S14, the storage controller 110 may perform the emergency flush operation. For example, the storage controller 110 may back-up the data stored in the emergency flush memory area MA_EF to the plurality of non-volatile memory devices 120.

FIG. 10 is a flowchart showing an operation of the storage device of FIG. 1 performing the emergency flush operation according to an some example embodiments. Referring to FIG. 1 to FIG. 10, at operation S110, the interrupt circuit 114 may detect the SPO of the storage device 100. For example, the storage controller 110 may perform the PLP operation. For example, the storage controller 110 may attempt to back-up the data stored in the PLP memory area MA_PLP to the plurality of non-volatile memory devices 120.

At operation S120, the interrupt circuit 114 may determine whether the PLP operation has succeeded during the PLP period pPLP. For example, the interrupt circuit 114 may determine whether the data stored in the PLP memory area MA_PLP has been successfully backed-up in the plurality of non-volatile memory devices 120 within a predetermined time length.

At operation S120, when it is determined that the PLP operation is successful (e.g., Yes at S120), the operation of the storage device 100 may be terminated. At operation S120, when it is determined that the PLP operation has failed (e.g., No at S120), operation S130 below may be performed.

At operation S130, the interrupt circuit 114 may transmit the emergency flush request REQ_EF to the non-volatile memory interface 115. For example, the interrupt circuit 114 may directly transmit the emergency flush request REQ_EF to each of the first to n-th NVM interfacing circuits NIC1 to NICn included in the non-volatile memory interface 115.

At operation S140, the non-volatile memory interface 115 may read the data stored in the emergency flush memory area MA_EF. For example, the first to n-th NVM interfacing circuits NIC1 to NICn may read data of the first to n-th sub-memory areas SMA1_EF to SMAn_EF, respectively.

At operation S150, the non-volatile memory interface 115 may program the data read through the operation S140 to the plurality of non-volatile memory devices 120. For example, the first to n-th NVM interfacing circuits NIC1 to NICn may program data of the first to n-th sub-memory areas SMA1_EF to SMAn_EF to the first to n-th non-volatile memory devices NVMD1 to NVMDn, respectively.

Figure 11:
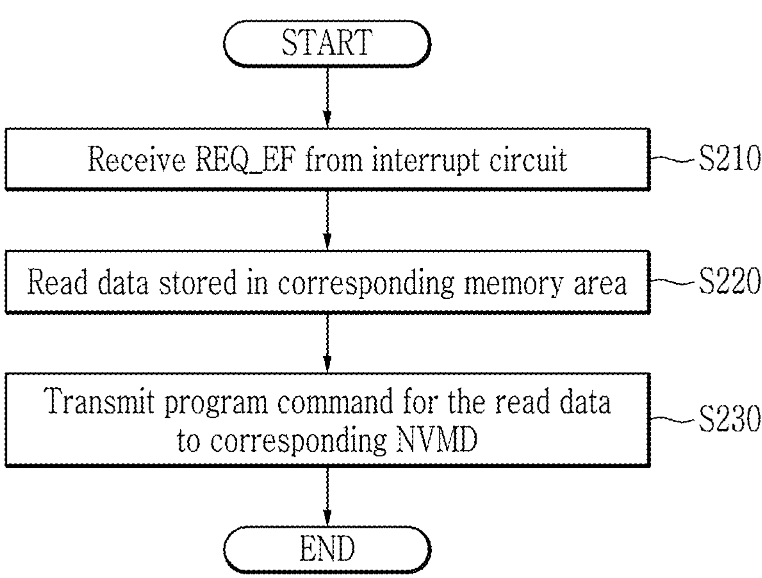
FIG. 11 is a flowchart showing an operation of one NVM interfacing circuit according to some example embodiments of FIG. 10.

FIG. 11 is a flowchart showing an operation of one NVM interfacing circuit according to the some example embodiments of FIG. 10. That is, hereinafter, with reference to FIG. 1 to FIG. 11, an operation of one of the first to n-th NVM interfacing circuits NIC1 to NICn will be described.

At operation S210, the NVM interfacing circuit NIC may receive the emergency flush request REQ_EF from the interrupt circuit 114. For example, the NVM interfacing circuit NIC may directly receive the emergency flush request REQ_EF from the interrupt circuit 114.

At operation S220, the NVM interfacing circuit NIC may read the data stored in a corresponding memory area. For example, the NVM interfacing circuit NIC may read data stored in a corresponding sub-memory area SMA_EF. For a more specific example, the first NVM interfacing circuit NIC1 may read the data stored in the first sub-memory area SMA1_EF, and the second NVM interfacing circuit NIC2 may read the data stored in the second sub-memory area SMA2_EF.

At operation S230, the NVM interfacing circuit NIC may transmit a program command with respect to the data read through the operation S220 to a corresponding non-volatile memory device NVMD. For example, the first NVM interfacing circuit NIC1 may program the data stored in the first sub-memory area SMA1_EF to the first non-volatile memory device NVMD1, and the second NVM interfacing circuit NIC2 may program the data stored in the second sub-memory area SMA2_EF to the second non-volatile memory device NVMD2.

FIG. 12 is a flowchart showing an operation of the storage device of FIG. 1 performing the emergency flush operation according to an some example embodiments. FIG. 1 to FIG. 9, and referring to FIG. 12, at operation S310, the interrupt circuit 114 may detect the SPO of the storage device 100. For example, the interrupt circuit 114 may transmit a notification of the occurrence of the SPO to the central processing unit 111, and the storage controller 110 may perform the PLP operation based thereon.

At operation S320, the interrupt circuit 114 may transmit the emergency flush request REQ_EF to the non-volatile memory interface 115. For example, the interrupt circuit 114 may directly transmit the emergency flush request REQ_EF to each of the first to n-th NVM interfacing circuits NIC1 to NICn included in the non-volatile memory interface 115. That is, the interrupt circuit 114 may issue the emergency flush request REQ_EF right after the occurrence of the SPO (e.g., at the first time point t1 of FIG. 3 or immediately thereafter).

At operation S330, the non-volatile memory interface 115 may determine whether the PLP operation was successful within the PLP period pPLP. For example, the non-volatile memory interface 115 may determine whether the data stored in the PLP memory area MA_PLP has been backed-up in the plurality of non-volatile memory devices 120.

In some example embodiments, the non-volatile memory interface 115 may directly determine whether the PLP operation was successful within the PLP period pPLP. However, the scope of the inventive concepts is not limited thereto, and the non-volatile memory interface 115 may be configured to receive a determination result of the interrupt circuit 114 related to whether the PLP operation of the interrupt circuit 114 is successful.

At operation S330, when it is determined that the PLP operation is successful (e.g., Yes at S330), the operation of the storage device 100 may be terminated. At operation S330, when it is determined that the PLP operation has failed (e.g., No at S330), operation S340 below may be performed.

At operation S340, the non-volatile memory interface 115 may read the data stored in the emergency flush memory area MA_EF. At operation S350, the non-volatile memory interface 115 may program the data read through the operation S340 to the plurality of non-volatile memory devices 120. The operation of the non-volatile memory interface 115 of the operation S340 and the operation S350 is similar to the operation S140 and operation S150 described above with reference to FIG. 10, and is not described in further detail.

That is, according to some example embodiments of FIG. 12, the non-volatile memory interface 115 may perform the operation S340 and the operation S350 when the PLP operation is not successful within a predetermined length of time (e.g., the PLP period pPLP) after receiving the emergency flush request REQ_EF at (or immediately after) the first time point t1. For example, the scope of the inventive concepts is not limited to a particular time point at which the interrupt circuit 114 transmits the emergency flush request REQ_EF to the non-volatile memory interface 115. For example, the interrupt circuit 114 may be configured to transmit the emergency flush request REQ_EF to the non-volatile memory interface 115 any arbitrary time point after the first time point t1 at which the SPO has occurred.

FIG. 13 to FIG. 14 are block diagrams showing an operation of the storage controller of FIG. 2 according to some example embodiments. Referring to FIG. 1 to FIG. 13, the storage controller 110 may include the central processing unit 111, the volatile memory device 112, the host interface 113, the interrupt circuit 114, and the non-volatile memory interface 115. The non-volatile memory interface 115 may include the plurality of NVM interfacing circuits NIC. For brevity of description, detailed description of components of the storage controller 110 described above with reference to FIG. 5 is not redundantly included herein.

The interrupt circuit 114 may transmit the emergency flush request REQ_EF to the non-volatile memory interface 115. For example, the interrupt circuit 114 may transmit the emergency flush request REQ_EF to each of the first to n-th NVM interfacing circuits NIC1 to NICn.

Each of the first to n-th NVM interfacing circuits NIC1 to NICn may issue a program command with respect to the data stored in different sub-memory areas, in response to the emergency flush request REQ_EF. For example, each of the first to n-th NVM interfacing circuits NIC1 to NICn may program the data stored in the sub-memory area allocated in a similar way as described above with reference to FIG. 8.

In some example embodiments, a defect may occur in a part of the first to n-th NVM interfacing circuits NIC1 to NICn. For example, a software or hardware defect may occur in at least one of the first to n-th NVM interfacing circuits NIC1 to NICn. For example, the data stored in the sub-memory area allocated to the NVM interfacing circuit NIC where the defect has occurred may not be backed-up in the plurality of non-volatile memory devices 120. For example, when a defect has occurred in the second NVM interfacing circuit NIC2, the data stored in the second sub-memory area SMA2_EF will not be backed-up in the second non-volatile memory device NVMD2.

In some example embodiments, when a defect has occurred in a part of the first to n-th NVM interfacing circuits NIC1 to NICn, the NVM interfacing circuit (e.g., the first NVM interfacing circuit NIC1) in which the defect has not occurred may back-up the data stored in the sub-memory area allocated to NVM interfacing circuit (e.g., the second NVM interfacing circuit NIC2) where the defect has occurred. For example, referring to FIG. 14 together, when a defect has occurred in the second NVM interfacing circuit NIC2, the second sub-memory area SMA2_EF may be allocated to the first NVM interfacing circuit NIC1 instead of the second NVM interfacing circuit NIC2. For example, the first NVM interfacing circuit NIC1 may program not only the data stored in the first sub-memory area SMA1_EF but also the data stored in the second sub-memory area SMA2_EF, to the first non-volatile memory device NVMD1.

That is, according to the some example embodiments described with reference to FIG. 13 to FIG. 14, even if a defect occurs in a part of the first to n-th NVM interfacing circuits NIC1 to NICn, the data stored in the emergency flush memory area MA_EF may be normally backed-up. Therefore, reliability of the storage device 100 may be improved.

Also, because the emergency flush request may be issued directly from the interrupt circuit 114 to the non-volatile memory interface 115, the storage controller 110 may have sufficient time to back up most or all of the data in the volatile memory device 112 to the plurality of non-volatile memory devices 120, further improving reliability of the storage device 100.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

Some example embodiments have been described for implementing the inventive concepts. The inventive concepts should include not only the above-described example embodiments, but also some example embodiments that may be simply design-changed or easily changed. The inventive concepts will also include techniques that may be easily modified and implemented by using the some example embodiments. While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. A storage controller in a storage device, the storage controller comprising: an interrupt circuit configured to detect a sudden power off (SPO) with respect to the storage device, and issue a SPO notification and an emergency flush request; a central processing unit configured to receive the SPO notification and issue a program request in response to the SPO notification; a volatile memory device comprising a plurality of memory areas; and a first non-volatile memory (NVM) interfacing circuit configured to program data stored in a first memory area among the plurality of memory areas to an external first non-volatile memory device in response to receiving the program request through a first path, and configured to program data stored in a second memory area among the plurality of memory areas to the external first non-volatile memory device in response to receiving the emergency flush request through a second path, wherein the first path is formed between the central processing unit and the first NVM interfacing circuit, and the second path is formed between the interrupt circuit and the first NVM interfacing circuit, wherein the interrupt circuit is configured to issue the SPO notification at a first time point when the SPO is detected and issue the emergency flush request based on failure of a power-loss protection (PLP) operation with respect to the volatile memory device performed based on the program request during a first time length after the first time point.

2. The storage controller of claim 1, further comprising a second NVM interfacing circuit, wherein the second NVM interfacing circuit is configured to program data stored in a third memory area among the plurality of memory areas to an external second non-volatile memory device in response to receiving the program request; and program data stored in a fourth memory area among the plurality of memory areas to the external second non-volatile memory device in response to receiving the emergency flush request.

3. The storage controller of claim 2, wherein the second NVM interfacing circuit is further configured to program the data stored in the second memory area to the external second non-volatile memory device in response to receiving the emergency flush request, when a defect has occurred in an operation of the first NVM interfacing circuit.

4. The storage controller of claim 1, wherein the interrupt circuit is configured to issue the emergency flush request when a defect has occurred in an operation of the central processing unit.

5. The storage controller of claim 1, wherein the second memory area comprises at least one of storage meta data, fail context data, and map data.

6. A storage controller, comprising:

a central processing unit comprising a first core configured to issue a first program request, and a second core configured to issue a second program request;

an interrupt circuit configured to issue a sudden power off (SPO) notification and an emergency flush request; and a non-volatile memory interface comprising a first non-volatile memory (NVM) interfacing circuit configured to issue a first program command in response to the first program request and issue a second program command in response to the emergency flush request, and a second NVM interfacing circuit configured to issue a third program command in response to the second program request and issue a fourth program command in response to the emergency flush request, wherein:

the central processing unit is configured to transfer the first program request and the second program request through a first path between the central processing unit and the NVM interface in response to the SPO notification; and the interrupt circuit is configured to transfer the emergency flush request through a second path between the interrupt circuit and the NVM interface, wherein the first NVM interfacing circuit and the second NVM interfacing circuit are configured to respectively issue the first program command and the third program command within a power-loss protection (PLP) period, after a first time point when a sudden power off (SPO) with respect to a storage device comprising the storage controller has occurred; and respectively issue both the second program command and the fourth program command within an emergency flush period after the PLP period, wherein ending of the PLP period indicates failure of the PLP operation.

7. The storage controller of claim 6, wherein the interrupt circuit is configured to issue the emergency flush request when a defect has occurred in an operation of the first core and the second core.

8. The storage controller of claim 6, wherein the first NVM interfacing circuit is configured to provide the first program command and the second program command to a first non-volatile memory device; and the second NVM interfacing circuit is configured to provide the third program command and the fourth program command to a second non-volatile memory device.

9. The storage controller of claim 6, wherein the first NVM interfacing circuit and the second NVM interfacing circuit are configured to receive the emergency flush request at the first time point, respectively.

10. The storage controller of claim 6, wherein the interrupt circuit is configured to issue the emergency flush request at a second time point between the PLP period and the emergency flush period.

11. The storage controller of claim 6, further comprising a volatile memory device comprising an emergency flush memory area and a PLP memory area including the emergency flush memory area, wherein the first program command and the third program command correspond to different sub-memory areas of the PLP memory area, and wherein the second program command and the fourth program command correspond to different sub-memory areas of the emergency flush memory area.

12. An operation method of a storage controller in a storage device, the storage controller comprising a volatile memory device, a central processing unit, a plurality of non-volatile memory (NVM) interfacing circuits, and an interrupt circuit configured to detect a sudden power off (SPO) with respect to the storage device, the operation method comprising:

transmitting, by the interrupt circuit at a first time point, an SPO notification to the central processing unit;

initiating, by the central processing unit, back-up for a first plurality of data stored in different first memory areas of the volatile memory device by controlling each of the plurality of NVM interfacing circuits in response to the SPO notification;

transmitting, by the interrupt circuit, an emergency flush request to each of the plurality of NVM interfacing circuits at a second time point that is a first time length after the first time point, based on a determination that the back-up has failed;

reading, by each of the plurality of NVM interfacing circuits, a second plurality of data stored in different second memory areas of the volatile memory device in response to the emergency flush request; and programming, by the plurality of NVM interfacing circuits, the second plurality of data to different non-volatile memory devices from among a plurality of non-volatile memory devices, respectively.

13. The operation method of claim 12, wherein: the central processing unit is configured to the back-up by controlling each of the plurality of NVM interfacing circuits through a first path between the central processing unit and the plurality of NVM interfacing circuits, the interrupt circuit is configured to transmit the emergency flush request to each of the plurality of NVM interfacing circuits through a second path between the interrupt circuit and the plurality of NVM interfacing circuits.

* * * * *